March 25, 1969   J. B. DAVIDSON   3,434,869
FOLEY CATHETER WITH SILICONE RUBBER COATING
Filed Nov. 2, 1964
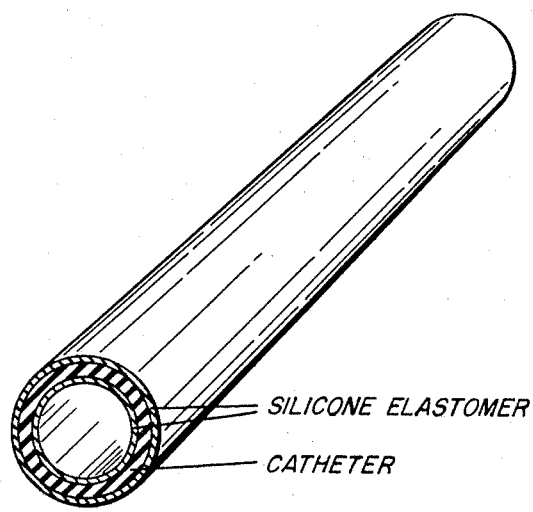
INVENTOR,
JAMES B. DAVIDSON
BY Robert F. Fleming Jr.
ATTORNEY

United States Patent Office 3,434,869
Patented Mar. 25, 1969

3,434,869
FOLEY CATHETER WITH SILICONE RUBBER COATING
James B. Davidson, Midland, Mich., assignor to Dow Corning Corporation, Midland, Mich., a corporation of Michigan
Filed Nov. 2, 1964, Ser. No. 411,667
Int. Cl. C09d 3/48; A61m 25/00
U.S. Cl. 117—94
4 Claims

ABSTRACT OF THE DISCLOSURE

A Foley catheter of organic rubber is coated with a surface layer of elastomeric silicone such as dimethylpolysiloxane containing a silica filler. The coated catheter causes less tissue irritation and is less adhesive to organic residue than the uncoated organic rubber catheter.

---

This application relates to silicone rubber coated catheters.

Catheters are widely used in medicine for draining fluids from the body and for permitting access to the interior of the body. Virtually all catheters are made of organic rubber, thermoplastic resins, or metal.

When catheters contact the living tissues of the body, there is a high likelihood for irritation to occur. Furthermore, body residues such as clotted blood and lymph in the case of catheters placed in incisions, and bladder stones in the case of urinary tract catheters, tend to adhere to the catheters. Frequent replacement of most catheters is therefore required.

An object of this invention is to provide a catheter that causes less tissue irritation and which is less adhesive to organic residues, so that the catheter can remain in the body without discomfort or danger for a longer period of time.

Another object is to provide a catheter with a permanent, nonflowing silicone coating that will not migrate into the body, which can bend with the bending catheter, and which cannot be easily removed from the catheter surface.

The product of this invention is a catheter made of organic rubber, having bonded to the surface thereof a cured, elastomeric silicone coating.

The drawing illustrates a product of this invention, showing a cross-section of a catheter which has both its outside and inside surfaces coated with silicone rubber. The layer marked "catheter" can be made of any organic rubber such as natural rubber, polybutadiene, poly(styrene-butadiene), poly(ethylenepropylene-cyclohexadiene) and butyl rubber.

The thickness of the silicone coating is not critical, so long as the coating keeps the organic substrate beneath the coating and away from contact with living tissue and body fluids. Silicone coatings as thin as one mil (1/1000 inch) have been successfully placed on catheters, and coatings of 100 or more mils thickness would not be undesirable, as long as the lumen (bore) of the catheter is not too small.

It is preferred for the elastomer coating to be primarily composed of dimethylpolysiloxane plus a silica filler, but other nontoxic silicones and fillers are also operative, e.g. ethylmethylpolysiloxane, 3,3,3-trifluoropropylmethylpolysiloxane, and copolymers of the above and dimethylpolysiloxane.

Silicone elastomer stocks are well-known and commercially sold, and a detailed discussion of their composition and variations is unnecessary. Silicone elastomer stocks which are especially prepared for medical usage are available from the Dow Corning Corporation of Midland, Mich.

The bond between the catheter and the silicone coating can be obtained by any suitable means. For example, the surface of the catheter can be subjected to radiation to form reaction sites on the surface, the surface then being contacted with a fluid silicone rubber composition. This technique is quite effective with organic rubber catheters. Alternatively, one can use a chemical primer to increase the adhesion between the catheter and the silicone rubber coating.

Acceptable primers for the bonding of the silicone coating to organic rubber catheters are disclosed in Canadian Patent 682,769, which relates to primers made of the reaction products of aminoorganosilicon compounds and epoxy resins.

A particularly suitable primer is found in a mixture of

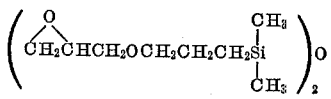

and $NH_2CH_2CH_2NHCH_2CH_2CH_2Si(OCH_3)_3$ in isopropanol or some other suitable solvent. Both of the above two compounds are well-known.

Another good primer results from a mixture of

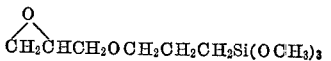

and ethylene diamine in isopropanol or another solvent.

Similarly, solutions of mercaptosilanes, such as $HSCH_2CH_2CH_2Si(OCH_3)_3$ in solvents such as isopropanol, make suitable primers for both organic rubbers and thermoplastic resins on exposure to ionizing radiation such as ultra violet light, or catalysts such as benzoyl peroxide. Heating is generally required when catalysts are used. If desired, water and methyl trimethoxysilane can be added to improve the priming.

Other priming techniques for the bonding of silicone rubber and thermoplastic resins are disclosed in patent application Ser. No. 362,923, now Patent No. 3,306,806, filed Apr. 27, 1964.

The catheter can be dipped, or otherwise coated with the priming solution and allowed to dry, with or without gentle heating. If organic catheters are used, it is frequently important to use a solvent that does not cause the organic rubber or thermoplastic of the catheter to swell greatly. When the organic material of the catheter is permitted to swell, a high percentage of the primer can migrate to the interior of the catheter, rather than remaining at the surface, which often results in a weaker bond.

The primed catheter can then be dipped into a dispersion of silicone elastomer stock in a volatile solvent. It is preferred for the silicone elastomer stock to constitute from 5 to 40 weight percent of the dispersion, but the concentration of the solution is not critical.

The catheter should be withdrawn from the silicone dispersion at a sufficiently slow rate to allow uniform coating of silicone elastomer stock on the catheter. If the catheter is withdrawn too rapidly, an uneven silicone coating will result. The catheter can be dipped in the coating solution more than once, preferably curing the coating between dips, if a thicker coating of silicone rubber is desired.

The final step in coating the catheter is to vulcanize the silicone rubber. This can be done by heating if desired, remembering that organic rubber and thermoplastic catheters may melt or deteriorate if excessive heat is used. For this reason, it is preferred to use a one-component room temperature vulcanizing silicone elastomer stock for coating the catheter, since heating is then not required. It is especially preferred for such an elastomer stock to contain dimethylpolysiloxane as a major ingredient.

The most suitable one-component silicone elastomer stocks comprise a siloxane of the average formula

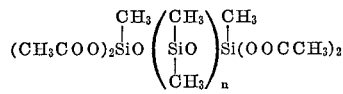

plus highly powdered silica,
where $n$ has an average value of greater than 100. Such elastomer stocks are sold commercially.

This invention is especially useful for catheters where it would be desirable for them to remain in contact with living tissue for an extended period of time, such as the well-known Foley catheter for the urinary tract. The silicone rubber coating on the catheter reduces inflammation and other bad side effects over the long term, permitting catheters to become semi-permanent fixtures in living bodies.

The following examples are illustrative only and should not be construed as limiting the invention which is properly delineated in the appended claims.

Example 1

A natural rubber Foley catheter was immersed in a one-phase primer consisting of 60 weight percent of acetone, 30 percent of water, 7.3 percent of a silicone consisting primarily of the average formula

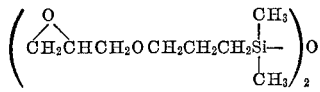

and 2.7 percent of a silicone consisting primarily of the average formula

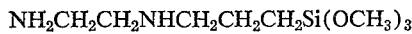

After the primer had contacted all portions of the catheter surface, both inside and outside, the catheter was removed from the primary bath and allowed to air dry.

The catheter was then dipped in a naphtha solution of a commercial one component room temperature vulcanizing silicone elastomer stock (Dow Corning Silastic RTV 140) consisting essentially of a dimethylpolysiloxane gum with about four silicon-bonded acetoxy groups per molecule, plus a silica filler. The solution contained 35 weight percent solids.

It was assured that the entire catheter surface was contacted with the solution, and then the catheter was removed from the solution.

The catheter was allowed to air dry overnight, and then it was given to a licensed doctor for testing.

The doctor used the catheter in the accustomed manner of Foley catheters in a patient. The catheter remained continuously in the patient for six weeks, at the end of which it was removed. The patient had felt no great discomfort due to the catheter, and no undesirable side effects were noted.

The accumulation of bladder stones on the catheter was negligible.

The doctor stated that normal catheters had to be replaced every four weeks in this particular patient because of the accumulation of bladder stones on the catheter. He was of the opinion that the silicone-coated catheter could have remained in the patient for considerably longer than the six weeks that it did remain.

Example 2

A natural rubber Foley catheter was treated in the manner of Example 1, and used in a patient. The patient remarked of his own accord about the improved comfort that the treated catheter gave him.

The catheter was replaced with an untreated natural rubber Foley catheter. The patient promptly complained of increased discomfort.

That which is claimed is:

1. A Foley catheter of organic rubber, having bonded to the surface thereof a cured, elastomeric silicone coating.

2. The catheter of claim 1 where the silicone coating is primarily composed of dimethylpolysiloxane plus a silica filler.

3. The article of claim 1 where the silicone coating is a one-component room temperature vulcanizing elastomer containing dimethylpolysiloxane.

4. The article of claim 1 where the silicone coating prior to cure is a one-component room temperature vulcanizing elastomer comprising a siloxane of the average formula

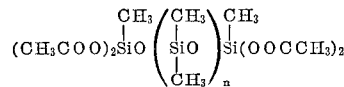

and high surface area powdered silica, where $n$ has an average of greater than 100.

References Cited

UNITED STATES PATENTS

| 2,626,426 | 1/1953 | Stahl | 264—173 X |
| 3,032,528 | 5/1962 | Nitzsche et al. | 260—46.5 |
| 3,035,016 | 5/1962 | Bruner | 260—46.5 |
| 3,088,847 | 5/1963 | Pines | 117—132 X |
| 3,108,898 | 10/1963 | Nitzsche et al. | 117—75 |

OTHER REFERENCES

Nasogastric Tubes, in the Bulletin of the Dow Corning Center for Aid to Medical Research, vol. 1, No. 1, p. 2, October 1959.

Stewart, R. D. and Sanislow, C., Silastic Intravenous Catheter. In the Bulletin of Dow Corning Center for Aid to Medical Research, vol. 4, No. 2, pp. 5, 6, April 1962.

ALFRED L. LEAVITT, *Primary Examiner.*

CHARLES R. WILSON, *Assistant Examiner.*

U.S. Cl. X.R.

117—95, 161; 128—349

UNITED STATES PATENT OFFICE
CERTIFICATE OF CORRECTION

Patent No. 3,434,869             March 25, 1969

James B. Davidson

It is certified that error appears in the above identified patent and that said Letters Patent are hereby corrected as shown below:

Column 3, line 55, after "which" insert -- time --. Column line 35, after "average" insert -- value --.

Signed and sealed this 3rd day of February, 1970.

(SEAL)
Attest:

Edward M. Fletcher, Jr.             WILLIAM E. SCHUYLER, JR.
Attesting Officer                     Commissioner of Patents